Sept. 28, 1937.　　　　N. E. DELL　　　　2,094,568
AIR ENTRAINING DEVICE
Original Filed Aug. 6, 1935　　2 Sheets-Sheet 2
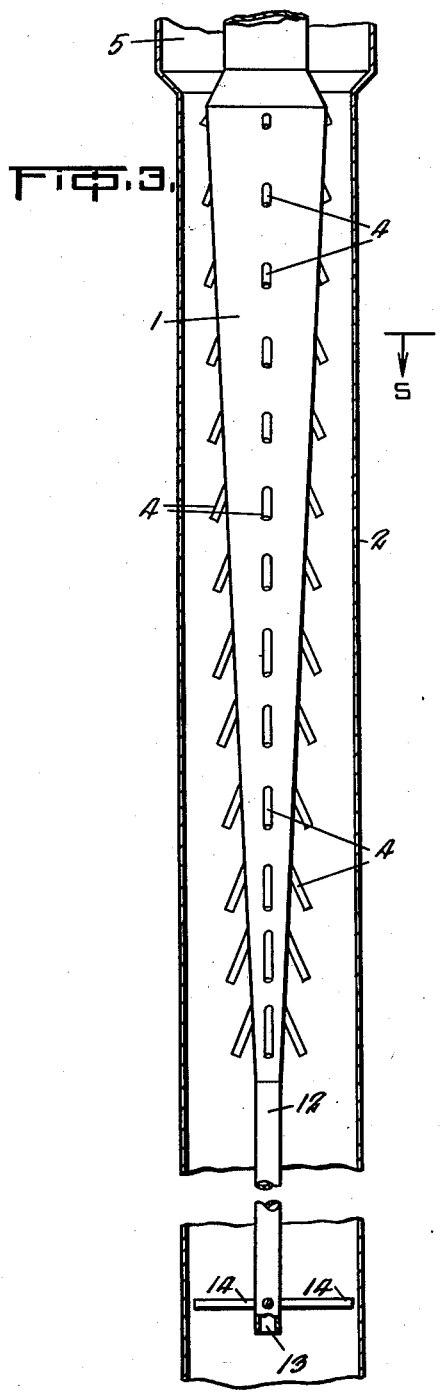
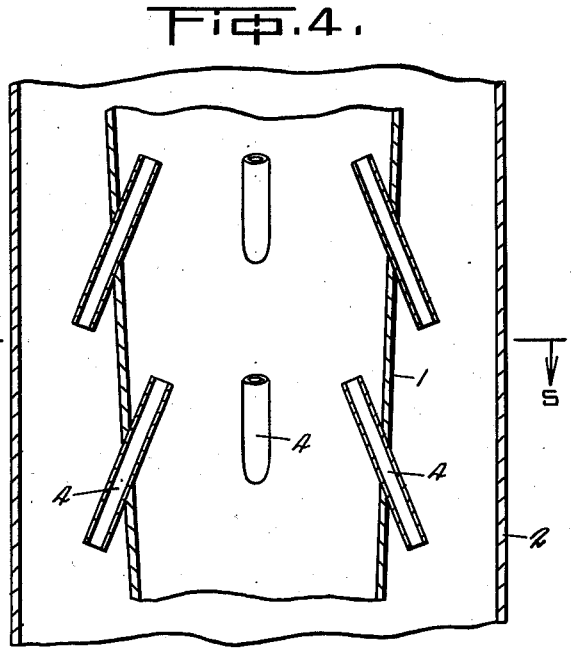
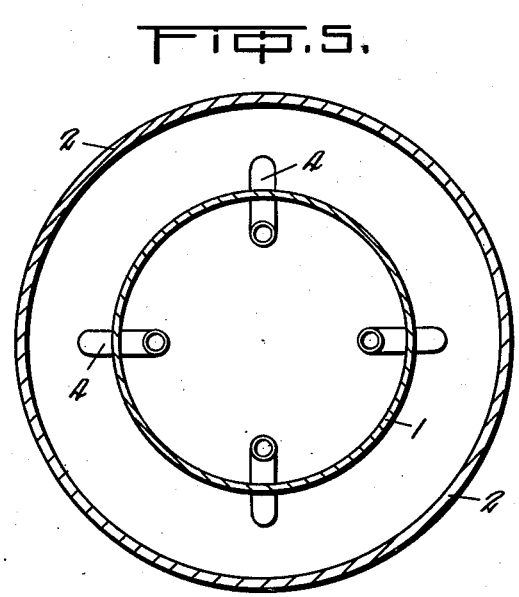
Inventor
Norman E. Dell Patented Sept. 28, 1937

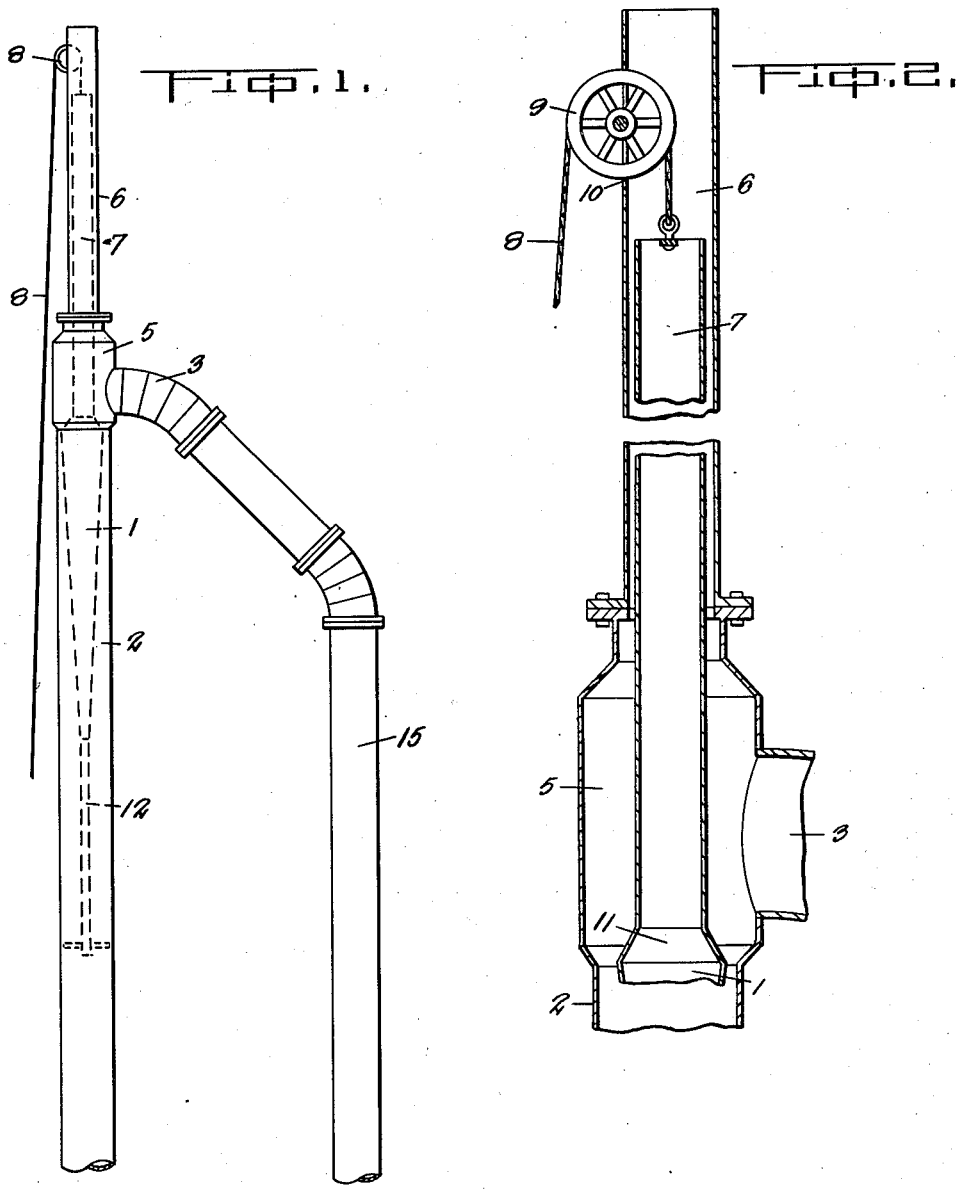

2,094,568

UNITED STATES PATENT OFFICE 2,094,568

AIR ENTRAINING DEVICE

Norman Eugene Dell, Buffalo, N. Y.

Application August 6, 1935, Serial No. 34,871
Renewed March 18, 1937

3 Claims. (Cl. 230—105)

My invention relates to improvements in air entraining devices for hydraulic induction air compressors of the type shown in my United States Patent No. 2,013,236 and the object of my invention is to provide an air entraining device of high efficiency and wherein the air is inducted into the central portion of the falling column of water.

Another object of my invention is to form the air entraining device of substantially inverted conical form with a plurality of air induction tubes protruding therefrom, the cone being centrally positioned within the falling column of water with its axis substantially concentric with the pipe through which the water falls.

My invention consists of an air entraining device all as hereinafter more particularly described and illustrated in the accompanying drawings in which:

Figure 1 is a side elevational view of the upper portion of a water circulating U pipe showing in dotted lines my entraining device positioned therein.

Figure 2 is an enlarged vertical cross sectional view through a portion of the U pipe and also through the upper portion of the air entraining device.

Figure 3 is a vertical cross sectional view through the water-fall pipe and disclosing the air entraining cone therein.

Figure 4 is a further enlarged vertical cross sectional view through the water-fall pipe and also through a fragmentary portion of the cone, and Figure 5 is a horizontal cross sectional view taken through the line 5—5, Figure 4.

Like characters of reference indicate corresponding parts in the different views in the drawings.

In the utilization of a falling body of water for entraining and compressing air or gases, the greatest difficulty has been found in providing an air entraining device of high efficiency. Most of the devices used heretofore, while functioning to a certain extent, have been of low efficiency due either to the fact that they retard the speed of the falling water or fail to thoroughly utilize the whole volume of the falling water for induction purposes.

My present invention has been designed and tested to overcome the foregoing defects and consists of an inverted elongated conical pipe 1 which is positioned within the upper end of the falling water pipe leg 2 of the water circulating U pipe 3. The upper end of the induction cone 1 is of a diameter greater than half the diameter of the pipe 2 and the lower portion of the cone of a diameter less than a quarter of the diameter of the pipe 2.

The cone is furnished with a plurality of air induction tubes 4 which radially project from the cone and are downwardly inclined. The tubes are open at their inner and outer ends, the inner ends of the tubes projecting upwardly into the cone.

The upper end or elbow 5 of the pipe 2 is in the form of an enlarged chamber opening into an open-topped vertical pipe 6 which acts as a guide for an inner pipe 7 projecting upwardly from the top of the cone 1. The pipe 7 is open at its upper end and constitutes the air intake for the induction cone.

The cone 1 and its extension pipe 7 are adjustably supported within the pipes 2 and 6 by means of a cable 8 carried around a pulley 9 which is journaled within a slot 10 in the upper end of the pipe 6. By manually releasing or drawing up the cable 8 the cone can be raised or lowered within the pipe 2. The upper end of the cone 1 is of greater diameter than the pipe 7 and a connecting pipe portion 11 of frusto conical form is interposed between the top of the cone and the pipe as a connection therebetween and over which the falling water has a non-impeded flow.

The lower end of the cone 1 merges into a downwardly extending pipe 12 open at its bottom 13 and of substantially the same diameter as the diameter of the lower end of the cone. The pipe 12 and the lower end of the cone to which it is attached is retained in a central position in the tube by the provision of several radial arms 14 which project from the pipe 12 into the vicinity of the wall of the pipe 2. The lower open end 13 of the pipe 12 acts as a further air induction means to the body of falling water after it passes over the cone.

The operating of my device is as follows:—

Water is pumped upwardly through the leg 15 of the U pipe 3 and enters the chamber 5 from where it falls downwardly through the pipe 2 around the cone 1. The water in passing from the chamber 5 into the pipe 2 is slightly retarded in velocity due to the top of the cone filling a large portion of the top of the pipe 2, but as the falling water passes this point it increases in velocity due to the convergence of the cone with the consequent increasing cross sectional area within the pipe. The air induction tubes 4 are so designed that they project to points substantially centrally of the distance between the cone and the inner wall of the pipe 2 at any given point, or in other words the projecting portions of the tubes increase in length as the cone decreases in diameter. By this construction the outer ends of the tubes are contained well within the body of the falling water stream.

The action of the falling water sucks or inducts air from the cone through the tubes 4 into the falling body of water where the air and water commingle and are carried downwardly into a suitable air and water receiving tank of the type as shown in my United States Patent No. 2,013,236. The air is supplied to the cone through the open-topped pipe 7.

In order to obtain the highest efficiency for various water velocities the cone is adjusted within the pipe 2. Although I have shown my air entraining device as used in conjunction with a pump circulated volume of water, it is to be understood that it can also be used in conjunction with a natural fall of water utilized for compressing air and, while I have shown a specific embodiment of my invention, it is also to be understood that I can make such changes and alterations as I may from time to time deem necessary without departing from the spirit of my invention as set forth in the appended claims.

What I claim as my invention is:

1. In an air entraining device of the character described, a substantially vertical pipe through which water falls, an air inlet pipe of inverted conical form contained within the water pipe and open to the atmosphere, and a plurality of air feeding tubes extending from the conical air inlet pipe into the water flow in the water pipe, the portions of the tubes projecting from the conical air pipe along its length being of an increasing length gradation inversely proportionate to the decrease of the conical air pipe in diameter.

2. In an air entraining device of the character described, a substantially vertical pipe through which water falls, an air inlet pipe of inverted conical form contained within the water pipe and open to the atmosphere, and a plurality of downwardly inclined air feeding tubes extending from the conical air inlet pipe into the water flow in the water pipe, the portions of the tubes projecting from the conical air pipe along its length being of an increasing length gradation inversely proportionate to the decrease of the conical air pipe in diameter.

3. In an air entraining device of the character described, a substantially vertical pipe through which water falls, an air inlet pipe of inverted conical form adjustably contained within the water pipe and open to the atmosphere, and a plurality of downwardly inclined air feeding tubes extending from the conical air inlet pipe into the water flow in the water pipe, the portions of the tubes projecting from the conical air pipe along its length being of an increasing length gradation inversely proportionate to the decrease of the conical air pipe in diameter.

NORMAN EUGENE DELL.